United States Patent
Neto et al.

(10) Patent No.: US 8,660,954 B2
(45) Date of Patent: Feb. 25, 2014

(54) FRAUD AND EVENTS INTEGRATED MANAGEMENT METHOD AND SYSTEM

(75) Inventors: João Eduardo Ferreira Neto, Campinas (BR); André Blasko, Campinas (BR); Helen Mary Murphy Peres Teixeira, Mona Vale (AU); Claudia Sciortino De Reina, Sao Paulo (BR)

(73) Assignee: Fundacao CPQD_Centro de Pesquisa E Desenvolvimento em Telecommuncacoes, Sao Paulo (BR)

( * ) Notice: Subject to any disclaimer, the term of this patent is extended or adjusted under 35 U.S.C. 154(b) by 266 days.

(21) Appl. No.: 12/772,745

(22) Filed: May 3, 2010

(65) Prior Publication Data

US 2011/0270752 A1    Nov. 3, 2011

(51) Int. Cl.
*G06Q 40/00*    (2012.01)
(52) U.S. Cl.
USPC .......................................................... 705/44
(58) Field of Classification Search
USPC .......................................................... 705/44
See application file for complete search history.

(56) References Cited

U.S. PATENT DOCUMENTS

| 8,082,349 B1* | 12/2011 | Bhargava et al. ............. 709/227 |
| 2006/0206941 A1* | 9/2006 | Collins ............................ 726/25 |
| 2007/0106582 A1* | 5/2007 | Baker et al. ..................... 705/35 |
| 2008/0046362 A1* | 2/2008 | Easterly ........................... 705/40 |
| 2010/0169202 A1* | 7/2010 | Shnowske et al. .............. 705/35 |

OTHER PUBLICATIONS

Hempel, Donal J et al : Developing an Information-Based Marketing Strategy . . . : A case Study, The Journal of Consumer Affairs(pre-1986) 16.2 (Winter 1982); 347.*
The Trombetta, William L. The Profession Under Scrutiny: An Antitrust Perspective; The Journal of Consumer Affairs (pre-1986) 16.1 (Summer 1982): 88.*
Bagby, John W. Comments: Enforcment of Accounting Standards . . . ; American Business Law Journal (pre-1986) 21.2 (Summer 1983): 213.*

* cited by examiner

Primary Examiner — Hani M Kazimi
Assistant Examiner — Hatem M Ali
(74) Attorney, Agent, or Firm — Finnegan Henderson Farabow Garrett & Dunner LLP (57) ABSTRACT

Methods and systems are disclosed for processing banking events. The methods and systems store data regarding a plurality of first banking events in a database. The methods and systems receive data regarding a second banking event and determine whether an electronic banking event analyzing system is available. If it is determined that an electronic banking event analyzing system is available, the stored data is analyzed, using the electronic banking event analyzing system, according to predetermined rules to determine a score indicative of proposed action regarding the second banking event. If it is determined that an electronic banking event analyzing system is not available, then a previously determined score is used as the score indicative of proposed action. The methods and systems electronically transmit the score indicative of proposed action and update the database with data regarding the second banking event based on the analysis.

20 Claims, 9 Drawing Sheets

FRAUD AND EVENTS INTEGRATED MANAGEMENT METHOD AND SYSTEM

This invention is for use in the banking sector, where it will both monitor IT (Information Technology) equipment safety and detect and prevent frauds during customer banking transactions (monetary and non-monetary).

Technological improvements added to the facility and practicality provided by the Internet have been changing the way people handle their checking accounts, pay their bills, invest their money and other banking transactions. Along with these technological advances, an increasing number of fraudulent actions have occurred, perpetrated by third parties, who hack into banking security systems and violate customers' rights. Hackers and defrauders are usually at least one step ahead of the banks' security system's protection resources, and are able to break through these barriers and rip-off valuable monetary resources from their clients.

Figure 1:
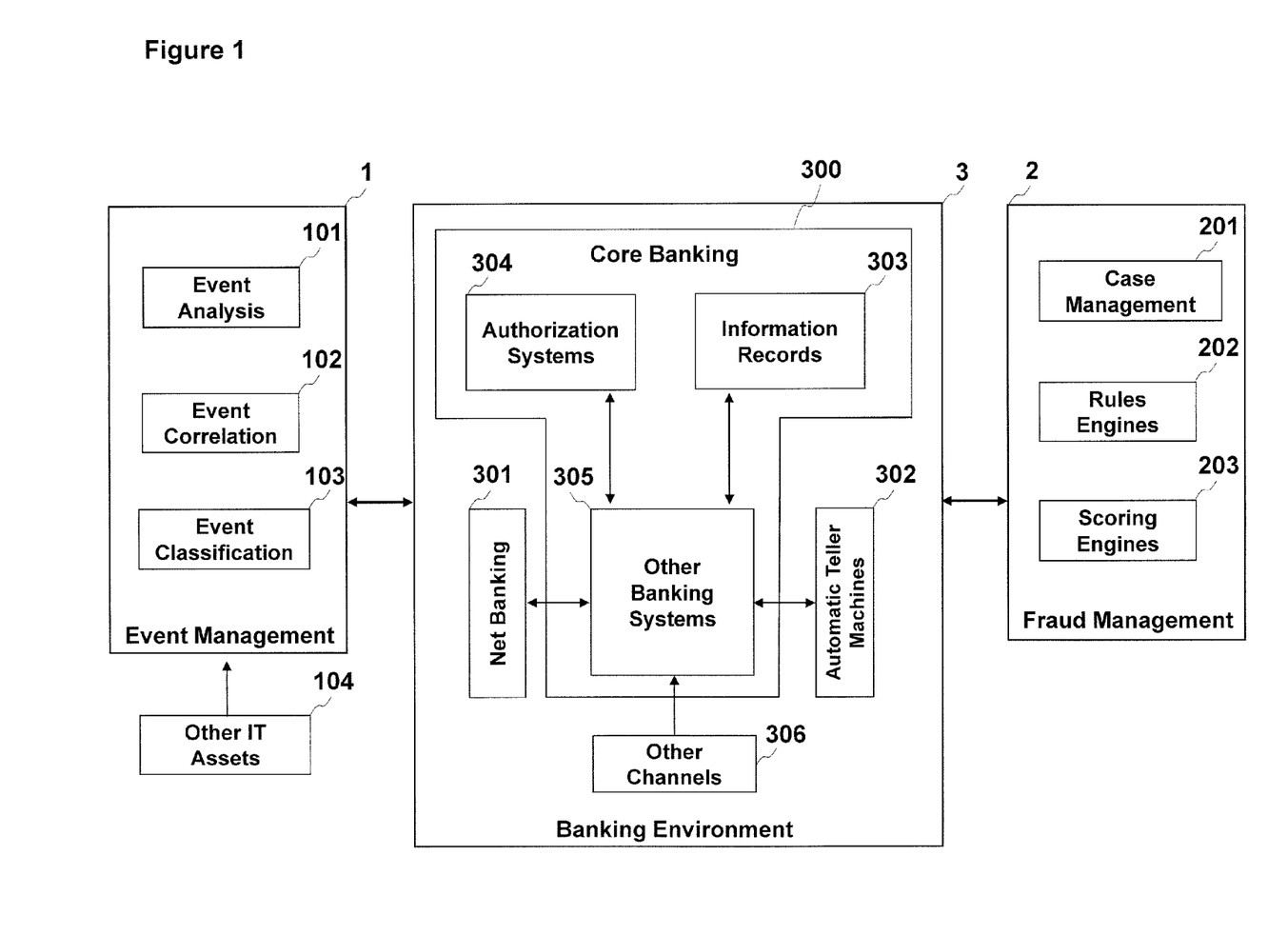
FIG. 1 represents the main elements that make up the existing solutions belonging to the Prior Art.

Countless research and development effort has been expended to create new technology able to prevent fraudulent actions and bank security break-ins with increasing efficiency. The following patents provide examples of these initiatives: US 2003/0182214 A1, US 2007/0028301 A1, US 2002/0069178 A1 and US 2006/0206941 A1, among others. These patents present methods and systems to restrain and block fraudulent actions that cause financial losses to bank customers by means of IT security event management or fraud detection and prevention management. FIG. 1 illustrates the main elements of these existing solutions, and their features are described below.

As a rule, IT Security Event Management Systems (1) investigate and monitor security events in a bank's IT equipment in real time (104), (301), (302). Suspicious events generate alarms, correlating malicious activities with security incidents, which are sent to the Banking Environment (3) for analysis. An IT Security Event Management System's features can be grouped into three basic categories: Event Analysis (101), Event Correlation (102) and Event Classification (103).

Event Analysis (101) analyses all accesses and events registered by the Banking Environment's (3) security system to detect and prevent fraudulent attacks. This analysis is the first action called for by Security Event Management (1) to combat electronic frauds.

Event Correlation (102) correlates accesses and events to identify patterns that might signify attacks/security incidents or fraudulent actions against the Banking Environment's (3) security system. This provides information to update and generate new security rules for the bank. Event Analysis (101) supports this correlation with more detailed information about the accesses/events and Event Correlation (102) is thus able to correlate them more assertively.

Event Classification (103) classifies accesses and events as suspicious/non-suspicious, as well as fraudulent/non-fraudulent. Thus, based on proven fraud and attack profiles in the bank's security system, new accesses or events can be more accurately classified, and prevention action immediately taken to avoid financial losses. The institution's security rules will also be updated and new rules created.

There are innumerable commercial IT security event management systems available on the market today, such as the Symantec Security Information Manager—SSIM from Symantec, the Proventia Intrusion Detection System (IDS) and the Proventia Intrusion Prevention System (IPS), both from IBM, to mention a few.

On the other hand, Fraud Detection and Prevention Management Systems (2) monitor banking transactions with various detection and fraud techniques. Of these, the most worthy of mention are artificial intelligence prediction techniques using neural network modeling—based on customers' behavioral profiles—, business rules and fraud propensity scores. These systems can thus provide the Banking Environment (3) with valuable input for decision-making, enabling them to distinguish potentially fraudulent transactions from those that are not fraudulent—in real time. Fraud Detection and Prevention Management Systems (2) have features that can be grouped into three basic categories: Case Management (201), the Rules Engine (202) and the Scoring Engine (203), as illustrated in FIG. 1.

Case Management (201) carries out extensive in-depth studies of all fishy bank transactions that for lack of sufficient information in the banking institution's systems have not yet been classified as fraudulent.

The Rules Engine (202) is made up of complex artificial intelligence algorithms (inference engines) that execute business rules to determine the propensity of banking transactions being fraudulent or not. Relevant cases are referred to Case Management (201) for investigation.

The Scoring Engine (203) is composed of artificial intelligence algorithms (predictive models) that attribute fraud scores to banking transactions. Among the commercial systems currently available on the market, we have Falcon from Fair Isaac, ACI Proactive Risk Manager from ACI Worldwide, among others.

As a rule, the Banking Environment (3) consists of a Core Banking suite (300), responsible for the automation of the banking institution's end-activities and for the coordination of all automation support activities. Activities that complement end-activities include recording customer transactions performed by other banking systems (305) and by channel platforms (301, 302 and 306), the upkeep of Information Records (304) and the communication with the Authorization Systems (304) that decide if customer transactions can be cleared or not, based on information provided by IT Security Event Management Systems (1) or by Fraud Detection and Prevention Management Systems (2), that many times are not integrated with the Banking Environment (3) and much less integrated among themselves (1 and 2), according to the findings of a Prior Art survey. Among the so-called Information Technology Assets (IT Assets), we have Internet Banking (301), Automated Teller Machines—ATMs (302) and other electronic channels for banking services (306), such as credit and debit card readers at Points of Sale, and the entire network for the capture and transmission of these transactions. Network servers, Web servers, database servers and Firewall access controllers, among others, are also part of a banking institution's IT Assets (104).

Therefore, the methods and systems currently available depend on either IT security event management or fraud detection and prevention management, and do not take into account the benefits of integrating the two systems to work simultaneously and conjointly. Furthermore, banking transactions continue fragile and vulnerable to attacks and fraudulent actions, warranting doubts as to the efficiency and efficacy of the banking institutions' current security systems, which can be characterized as more reactive than proactive.

In light of the above, the objective of this invention is to provide a method and a system that will integrate, online and in real time, the treatment of suspicious IT security events with fraud detection and prevention, using mutual feedback mechanisms to increase their individual benefits.

An additional objective of the invention is to monitor and correlate all customer banking transactions in the various electronic banking channels provided by the bank, monitoring and preventing criminal hacking of their checking accounts.

It is also the objective of this invention to enable preventive and proactive measures to identify fraudulent actions that are inconsistent with the account-holder's profile, submitting such transactions to a more thorough investigation before clearing.

Last but not least, the invention proposes to eliminate the need for the Core Banking System (300) to be constantly altered in order to keep up with the constant evolution of the IT Security Event Management (1) and Fraud Detection and Prevention Management systems. The Core Banking System (300) usually consists of legacy applications; in other words, applications that have been implemented and altered over time to meet the needs of the financial institution. These applications are frequently difficult to maintain and not easily adaptable to new technology.

The abovementioned objectives are accomplished by means of an Integrated Fraud and Event Management Method and System, providing continuous and real-time integration of fraud and security event management in the banking environment. The invention integrates, analyzes and correlates all information from an IT Security Event Management System and a Fraud Detection and Prevention Management System pertaining to a security event (originating from an IT Asset) or a banking transaction (originating from a Banking Environment). This information is forwarded online to Core Banking, with supplementary information to enable the Banking Environment's authorization mechanisms to make accurate decisions as to whether they should clear or block a transaction, or request additional end-customer identification (positive customer identification) before authorizing said transaction.

The following detailed description of the figures herein contained will make the invention more easily understood.

Figure 2:
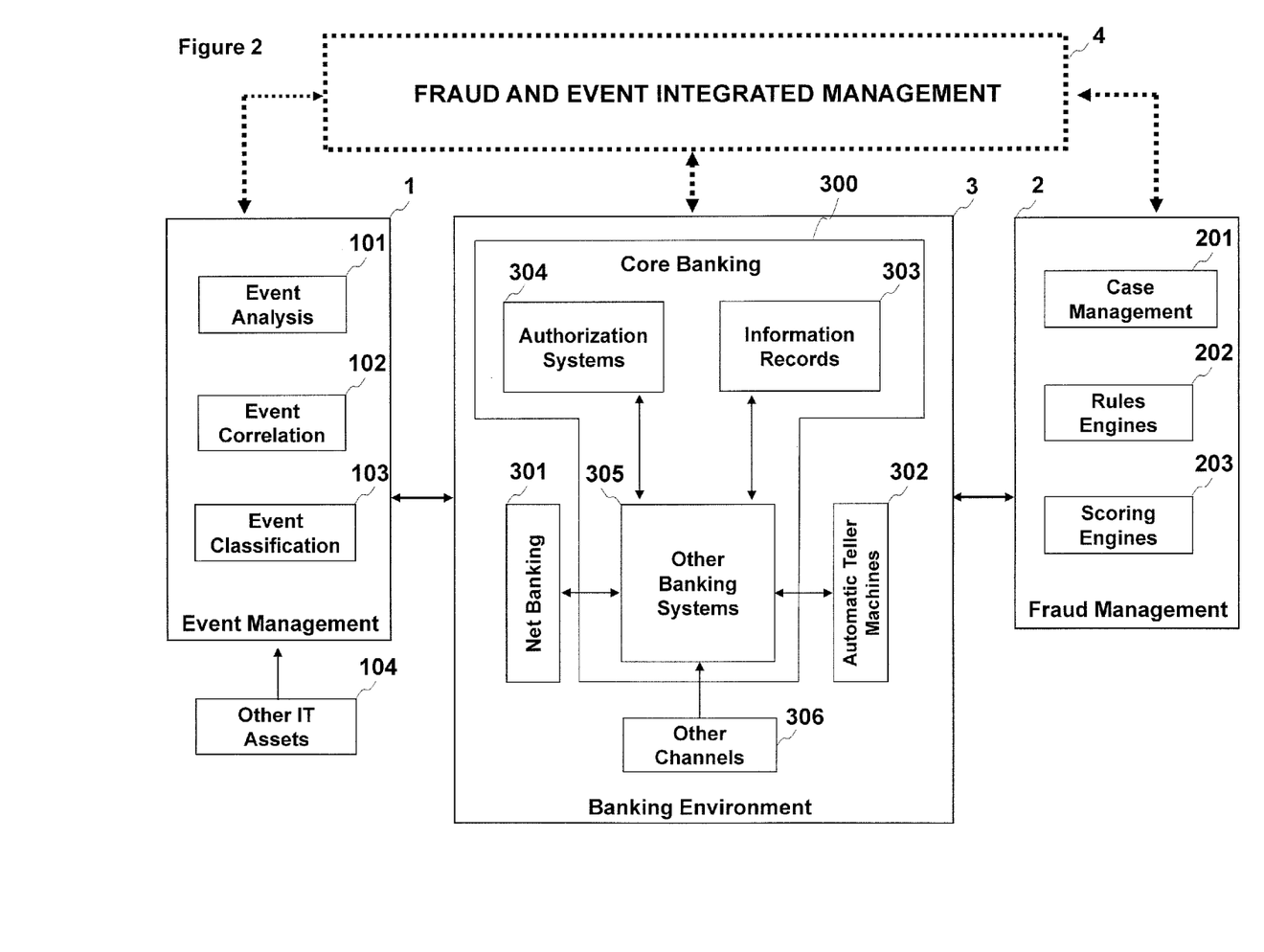
FIG. 2 provides a macro-view of the invention, highlighting the innovations compared to the Prior Art.

To embody the logical concepts illustrated in FIG. 2, a functional architecture has been defined for the Fraud and Events Integrated Management Method and System. This architecture, which can be seen in FIG. 3, divides the system into 6 functional modules: a Data Collection Module (401), a Transaction Treatment and Scoring Module (402), a Restrictions Management Module (403), an External Case Management Module (404), a Contingency Management Module (405) and an ATM Monitoring Module (406).

Figure 3:
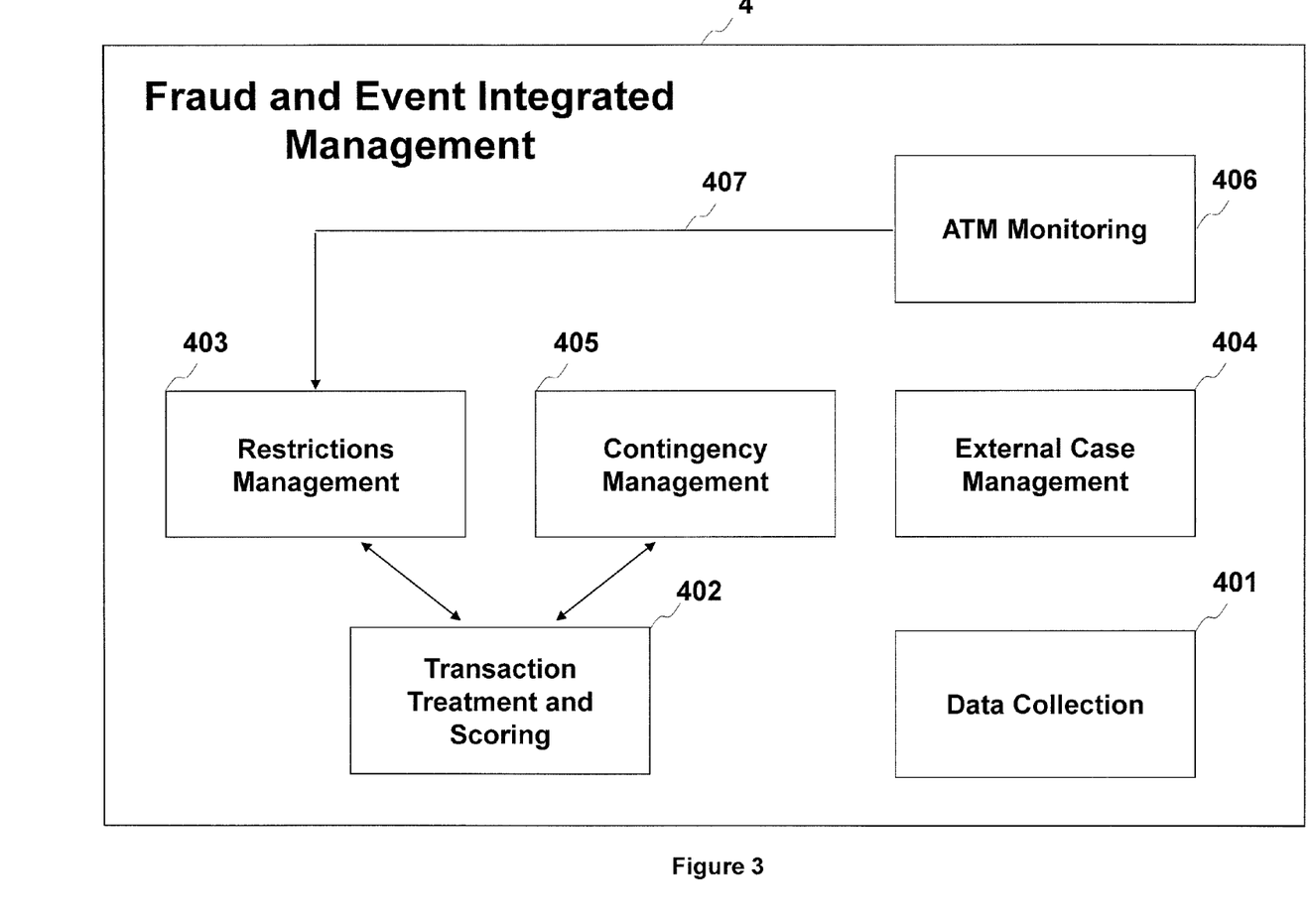
FIG. 3 illustrates the functional architecture of the system, displaying the modules that make up the Fraud and Events Integrated Management System.

The Data Collection Module (401) collects, organizes and makes available the bank institution's record information of customers, products and service channels, among others. It gathers this multi-source information, standardizes it and makes it intelligible to the other modules and system components.

The Transaction Treatment and Scoring Module (402) handles both monetary and non-monetary banking transactions originating from the Banking Environment (3) through their Authorization Systems (304). These transactions are checked for possible restrictions by means of the Restrictions Management Module (403), and then sent to the Fraud Management System (2), who returns them to the module with a score and the recommendation to authorize them or not. The result of this investigative process is forwarded to the Authorization System (304) by messaging services or the Banking Environment's (s) Web services. To complement this, the Transaction Treatment and Scoring Module (402) may eventually send, based on the score and recommendation received from the Fraud Management System (2), new restrictions data to the Restrictions Management Module, in a continuous cycle.

The Restrictions Management Module (403) provides the Fraud and Events Integrated Management System (4) with an integrated restrictions list. This anti-fraud mechanism allows it to consult configurable lists of IP addresses, ATM codes, branches/accounts and debit cards, among others, with restrictions (negative lists) or without restrictions (positive lists). This makes future investigations much more efficient, whenever a transaction or access is considered suspicious by the Fraud and Events Integrated Management System (4). These restrictions can originate from the invention's systems themselves or from other mechanisms/sources.

The External Case Management Module (404) receives and makes available all information regarding external cases of suspected banking frauds directly originated from customer complaints. Once the bank institution's internal processes confirm a fraud, the case is updated with information on how it was handled. Once the information regarding external cases is made available, it will be used conjointly with cases detected by the Fraud Detection and Prevention Management System (2).

The Contingency Management Module (405) places in contingency mode any banking operation that cannot be treated due to failure or unavailability of the Fraud Detection and Prevention Management System (2). The Authorization System (304) then receives a message, by means of messaging services or Web services, regarding this status. It also receives the last fraud score and recommendation generated for the customer's last treated banking transaction before the collapse. Once the system has fully recovered, the Fraud and Events Integrated Management System (4) will treat all transactions that took place before the breakdown.

The ATM Monitoring Module (406) is responsible for detecting suspicious patterns or variations of ATM usage by customers by running periodical checks of the frequency of ATM banking transactions. When a suspicious variation is detected, an alarm is set off. Once a suspicious action has been confirmed by the banking institution as malicious, the module enables new restrictions to be included in the Restrictions Management Module's (403) restriction mechanisms, and the Transaction Treatment and Scoring Module (402) is thus able to evaluate more assertively any Bank Cards that might have been compromised in the respective ATMs.

This modular structure allows the Fraud and Events Integrated Management System to be configured according to each institution's need, since all modules can work individually or collectively. The greatest benefit is obviously achieved when all modules are integrated and work together. This makes decision regarding suspicious transactions/accesses or attacks/security incidents more assertive.

Communication among the modules is real-time, dynamic, and continuous, and is triggered by banking events, with the purpose of evaluating them as fraudulent or not. In this context, a banking event can be defined as one of the following situations: a) the execution of a banking transaction; b) monitored or investigated electronic access; and c) fraud or IT security attack suspicions. The result of this evaluation is a score which is sent to the banking institution by means of messaging services or Web services. Based on this score, and with their business rules in operation, banking institutions can then clear or block said events with greater accuracy, which is normally accomplished by the Authorization System (304), as illustrated in FIG. 2.

The Restrictions Management Module (403) and the Contingency Management Module (405) are integrated by calling up functions and methods, as well as by Web services, by means of continuous interactions with the Transaction Treatment and Scoring Module (402, as shown in FIG. 3.

Figure 4:
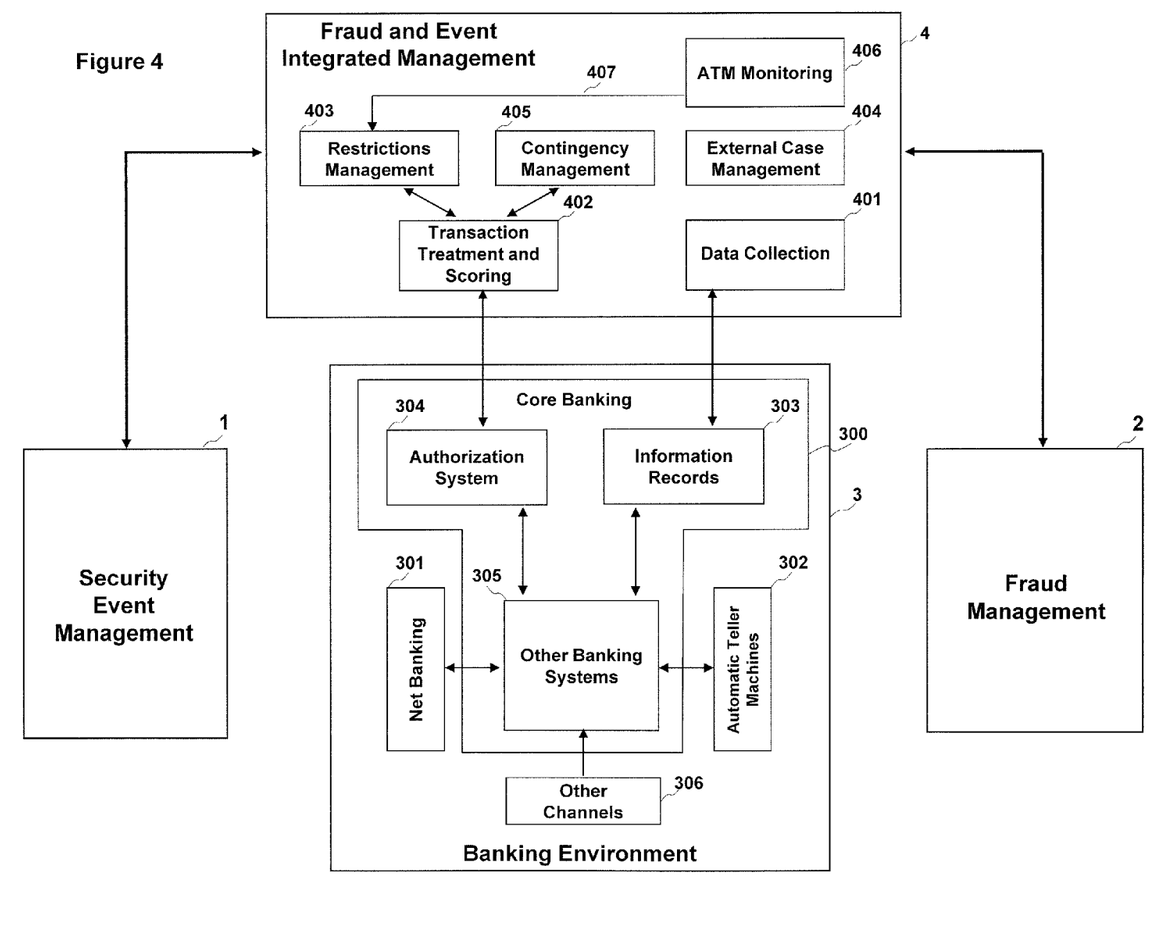
FIG. 4 provides an overview of the invention.

As new banking events occur, all their information, as well as all pertinent data of the customers involved, is updated in the Fraud and Events Integrated Management System. This generates a wider knowledge base, and enables future events to be analyzed with more assertiveness in the fight against fraud and the efforts to halt IT security incidents/attacks. The operational principles are illustrated in FIG. 4, which provides an overview of the invention. The connection (407) between the Transaction Treatment and Scoring Module (402) and the Authorization System (304) allows messages and banking transactions be first collected by the Treatment and Scoring Module (402) and then forwarded to the Authorization System (304) with their respective score and recommendation.

To achieve these breakthrough techniques, an efficient set of mechanisms is needed to integrate the above-described elements. These mechanisms are described below.

Figure 5:
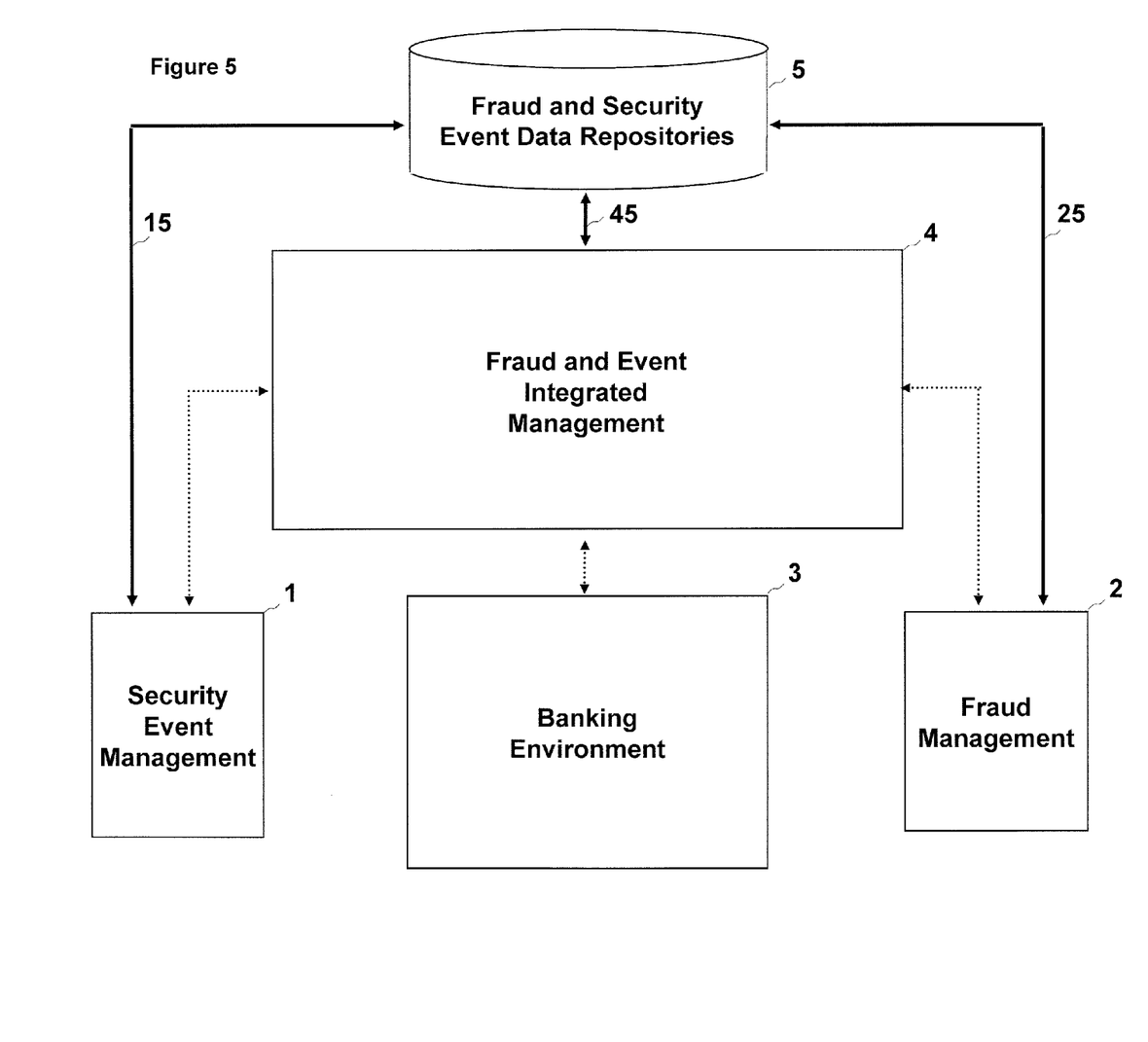
FIG. 5 illustrates the mechanisms for the integration of the Fraud and Events Integrated Management System with the Security Events Management System and the Fraud Management System by means of Fraud and Security Events Data Repositories.

1. Fraud and Security Events Data Repository:

This is a special database interconnected to the other components, as illustrated in FIG. 5, containing detailed relevant information about banking events (data and information regarding customer banking transactions and electronic accesses, suspicious/proven fraud cases and security attacks/incidents). This data is readily available as valuable input for the assessment and investigation of similar events, that may take place simultaneously, in real-time, or in distinct moments and situations. By using this Fraud and Security Events Data Repository, not only are all the redundancies and inconsistencies of data from other sources eliminated, but a complete and integrated view of the status of past or ongoing banking event investigations is also possible, enabling this knowledge to be explored and applied in one single system.

In FIG. 5, line (15) represents the bidirectional connection between the IT Security Events Management System (1) and the Fraud and Security Events Data Repository (5). Through this connection, any fraud-history data regarding security events against the banking institution is made available in the Repository by the IT Security Event Management System, where it is retrieved and maintained by the Fraud and Events Integrated Management System (4) in a high-quality, consistent and fast format, thus ensuring greater precision in the investigation and analysis of new threats against IT security systems.

In FIG. 5, line (25) represents the bidirectional connection between the Fraud Detection and Prevention Management System (2) and the Fraud and Security Events Data Repository (5). Through this connection, any fraud-history data is made available in the Repository by the Fraud Detection and Prevention Management System (2), where it is retrieved and maintained by the Fraud and Events Integrated Management System (4) in a high-quality, consistent and fast format, thus ensuring greater precision in the investigation and analysis of new suspicions or fresh fraudulent actions against the institutions' systems.

In FIG. 5, line (45) represents the connection between the Fraud and Events Integrated Management System (4) and the Fraud and Security Events Data Repository (5), by which the data flow between these elements takes place. This communication is two-way, enabling the storage and retrieval of data regarding suspected/proven frauds and IT security attacks/incidents in an appropriate format, allowing it to be deployed, for instance, by means of a Database Management System (DBMS).

By means of the above described connections, (15), (25) and (45), the IT Security Event Management System (1) and the Fraud Detection and Prevention Management System (2) no longer communicate directly with the Banking Environment (3), as illustrated in FIG. 1 (Prior Art), but rather by means of the Fraud and Events Integrated Management System (4) and its respective Fraud and Security Events Data Repository (5) as illustrated in FIG. 5. This eliminates the need for the Core Banking System (300) to be constantly altered to conform to the evolutions of IT Security Event Management Systems and Fraud Detection and Prevention Management Systems (2), making it far easier to adapt the Banking Environment (3) to the new technology used by these systems, and cutting evolutional maintenance costs considerably.

Figure 6:
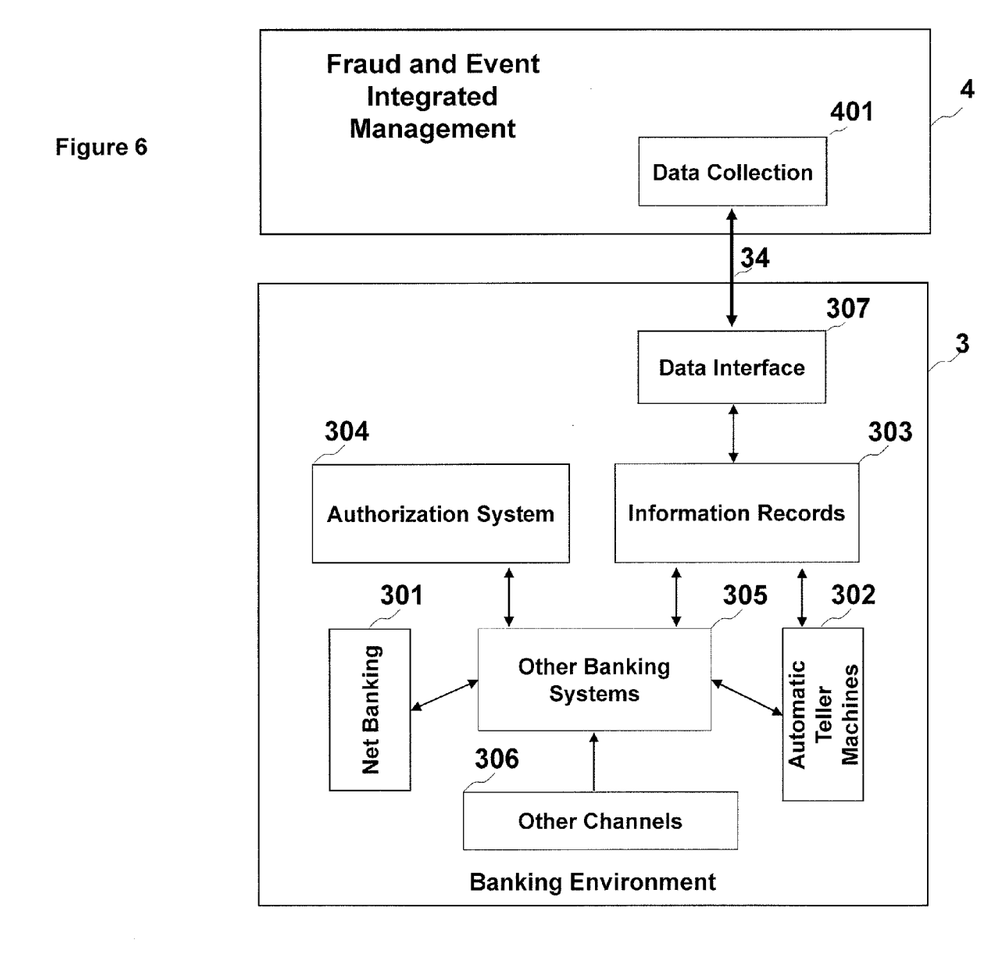
FIG. 6 illustrates the mechanisms for the integration of the Fraud and Events Integrated Management System with the Banking Environment.

2. Banking Environment Interfaces:

The connections between the Fraud and Events Integrated Management System (4) and Banking Environment (3), as illustrated in FIG. 6, are two additional integration mechanisms utilized by the system.

In FIG. 6, the (34) represents the connection between the Fraud and Events Integrated Management System (4) and the Banking Environment (3) for the collection of record information of their customers, products, service channels, among others. On the Fraud and Events Integrated Management System's (4) end, this function is executed by the previously described Data Collection Module (401), while in the Banking Environment (3), a Data Interface (307) is added to interconnect with the Record Information Services (303).

Figure 7:
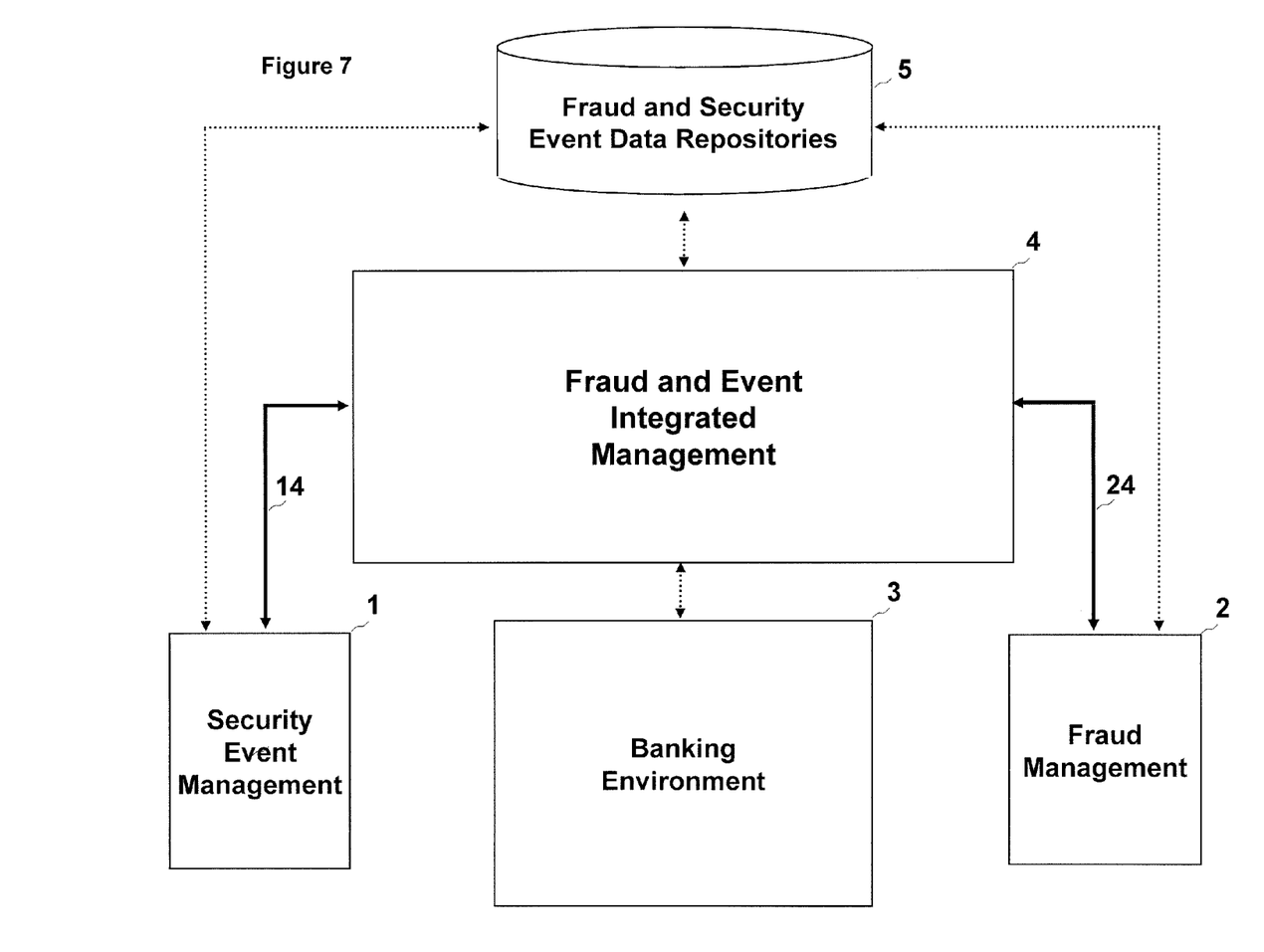
FIG. 7 illustrates the mechanism for integrating the Fraud and Event Management System with the Security Event Management System and the Fraud Management System.

3. IT Security Event Management System (1) and Fraud Detection and Prevention Management System (2) Interfaces:

The connections between the Fraud and Events Integrated Management System (4) and systems (1) and (2) are two additional integration mechanisms, as illustrated in FIG. 7.

In FIG. 7, line (14) represents the bidirectional connection between the Fraud and Events Integrated Management System (4) and the IT Security Event Management System (1). This connection enables online, real-time investigation of security events, for a full confirmation of malicious activity. Relevant results of this confirmation are then made available for future investigations. This makes it easier to generate new event correlation rules and forwards important information swiftly and securely to the Banking Environment (3), which will use them as valuable input to block similar cases.

In FIG. 7, line (24) represents the connection between the Fraud and Events Integrated Management System (4) and the Fraud Detection and Prevention Management System (2). This connection enables the Fraud Detection and Prevention Management System (2) to send, at any moment, online and in real-time, potential fraud cases to be more thoroughly investigated by the Fraud and Events Integrated Management System (4), based on former scores as well as on proven fraud cases, or cases that require more detailed investigations or longer periods of monitoring than usual, according to the norms of the banking institution established in its Banking Environment (3).

Figure 8:
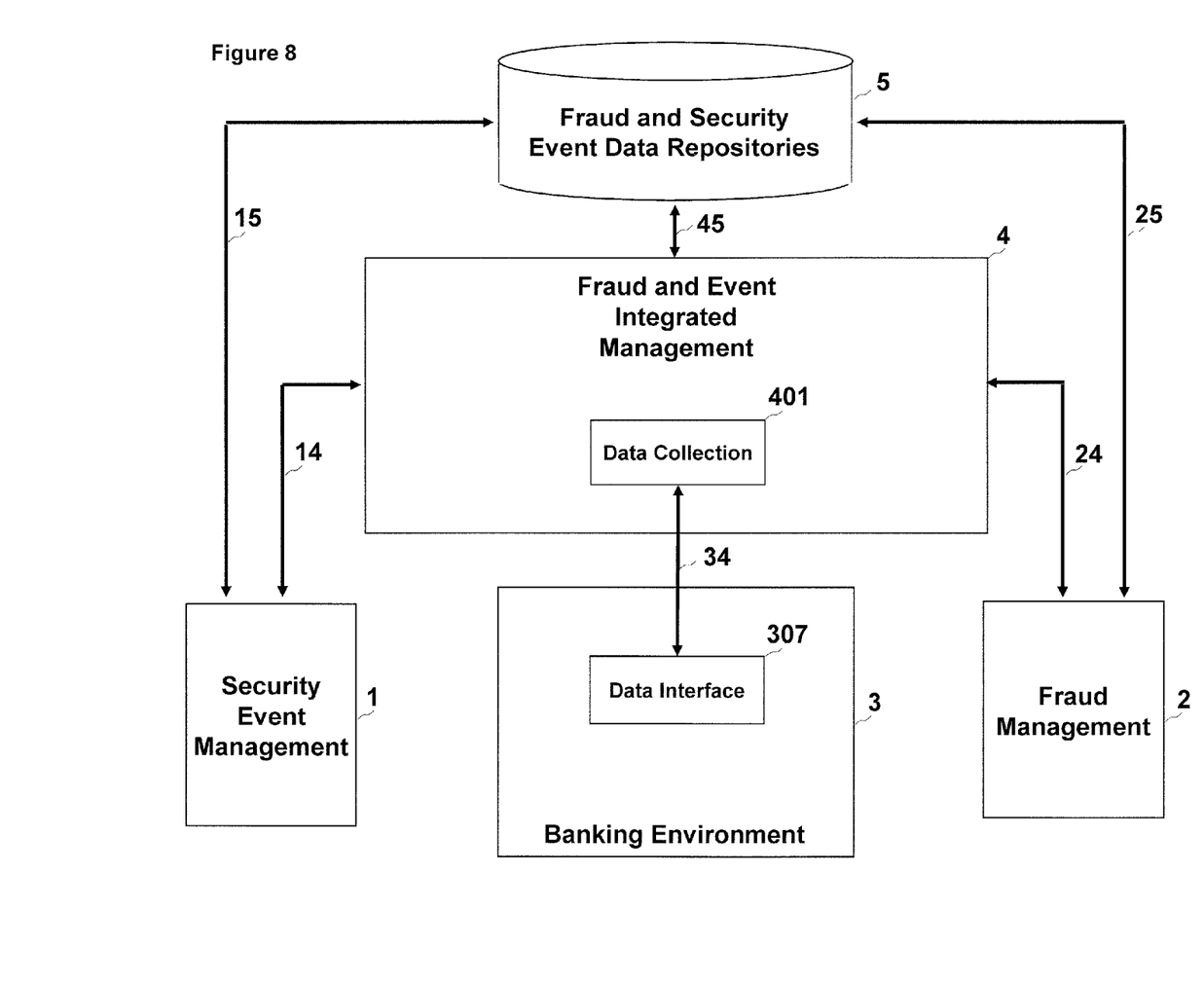
FIG. 8 provides a joint view of the integration mechanisms used by Fraud and Events Integrated Management.

FIG. 8 provides a complete overview of the adopted integration mechanisms, providing a general panorama of the interfaces that connect the invention's main components.

Since each one of the elements that are part the invention and its interconnections has been described individually, we will now present dynamic behaviors of Fraud and Events Integrated Management that can be implemented to achieve the invention's goals. These behaviors can be better understood by observing FIG. 9.

Figure 9:
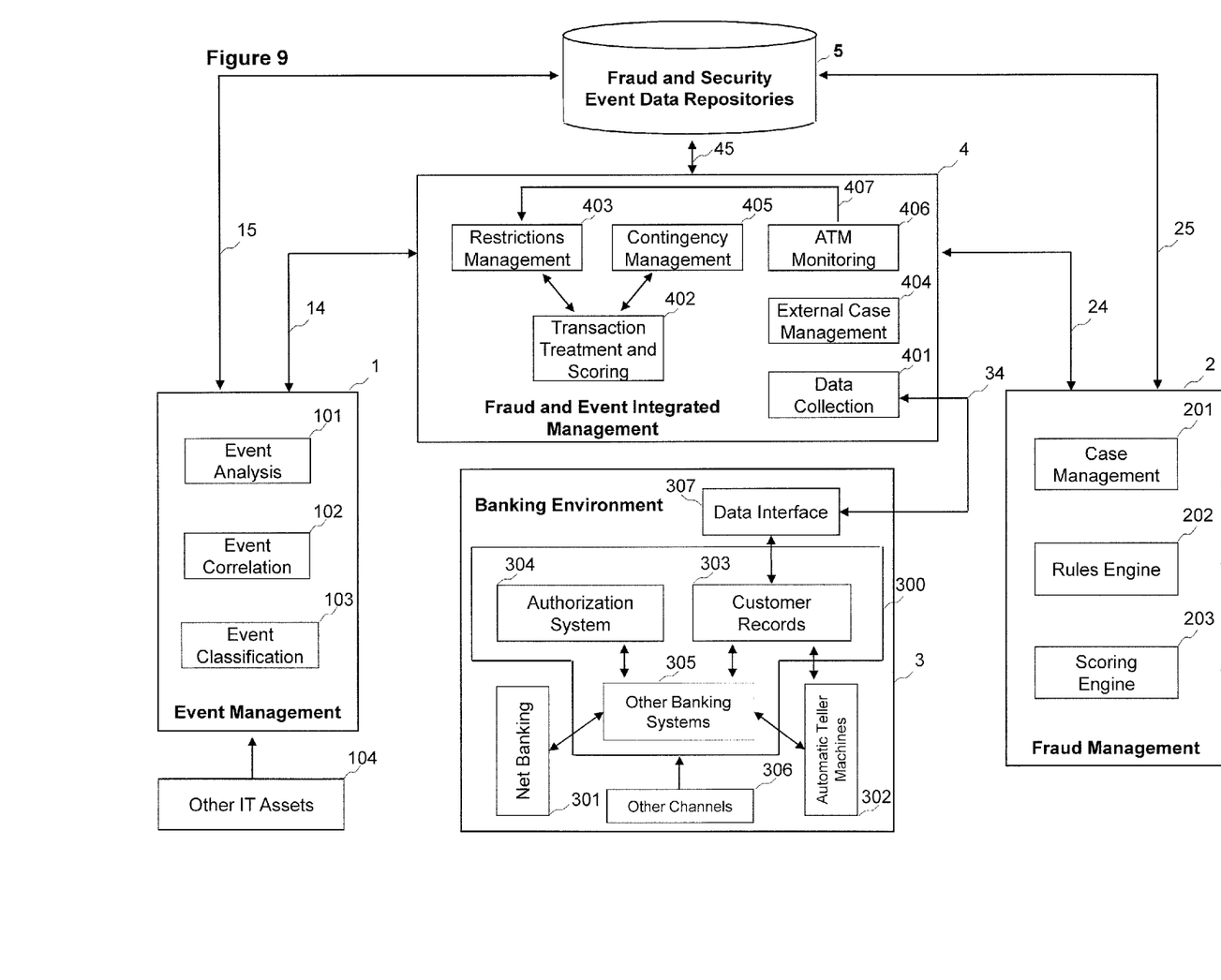
FIG. 9 illustrates the elements that make up Fraud and Events Integrated Management and the connecting links between these elements.

As a rule, the Fraud and Events Integrated Management System (4) is set in motion when the Banking Environment (3) needs to investigate a banking transaction or a potential/proven fraudulent access more thoroughly. The purpose of the Fraud and Events Integrated Management System (4) is to interact continuously with the IT Security Event Management System (1) and with the Fraud Detection and Prevention Management System (2), providing the Banking Environment (3) with more precise information to support its decisions to clear or not clear such transactions. To this end, the banking transaction or banking access will be submitted to investigation, using scientific methods and techniques, to ascertain whether or not it is a fraudulent action, taking into consideration the integrated evaluation of information from the following sources: analysis, correlation and security events classification, provided by the IT Security Event Management System (1) and case management, the rules and scoring engines, provided by the Fraud Detection and Prevention Management System (2).

An integrated analysis of this information is carried out by the Fraud and Events Integrated Management System (4) which, besides the support of the Fraud and Security Events Data Repository (5) and the implemented connection mechanisms with systems (1) and (2) and with the Banking Environment (3), carries out its functions by means of Data Collection (401), Transaction Treatment and Scoring (402), Restrictions Management (403), External Case Management (404), Contingency Management (405) and ATM Monitoring (406). Only after this entire process is completed can it send additional information to the Banking Environment (3), providing valuable input to help it make more precise decisions as to whether said transaction or access should be blocked or cleared.

Below we describe two preferred realization modes of the invention when dealing with potentially fraudulent banking transactions or electronic accesses.

a) Dealing with Banking Transactions:

When the Banking Environment (3), by means of their authorization system, sends the data of a potentially fraudulent banking transaction to the Fraud and Events Integrated Management System (4), via messaging services or Web services, it is immediately assessed by the invention's modules and systems, which will create a score and a recommendation to be sent to the Authorization System (304). If the fraud score is considered high or low, according to the business rules of the banking institution, the Fraud and Events Integrated Management System (4) uses this information to broaden the knowledge base of the Restrictions Management Module (403), and also updates the records of the Fraud and Security Events Data Repository (5). The Banking Environment (3) is thus provided with valuable input to help decide whether to clear or block suspicious transactions.

If, based on available information, the transaction should merit further analysis, the Fraud and Events Integrated Management System (4) sends the transaction details to the Security Events Management System (1) for a more thorough investigation, increasing the possibility of detecting malicious security events. The transaction can be sent to the Security Event Management System (1) by means of a communication protocol such as TCP/IP Sockets or via messaging services or Web services. The data can also be returned to the Banking Environment (3) via messaging services or Web services.

During any one of the above-described procedures, the Fraud and Events Integrated Management System (4) can access, at any moment, via DBMS, the Fraud and Security Events Data Repository (5) to broaden the scope of the investigations even more, eliciting a more precise final assessment. Likewise, at the end of each stage, the Fraud and Events Integrated Management System (4) uses a DBMS to forward the data to the Fraud and Security Events Data Repository (5) for storage and utilization in future investigations of the same customer, or even of other customers, in a progressive enriching process of said data repository. Additionally, any time new security events are investigated, analyzed, and proven fraudulent, the banking institution has the option of creating new business and IT security event correlation rules in the IT Security Event Management System (1).

Even if the Banking Environment (3) has already authorized a certain baking transaction based on the score and recommendation received from the Fraud and Events Integrated Management System (4), this transaction may probabilistically be included in the volume of undetected false-positive transactions. However, all further transactions of this customer will be monitored and treated by the Fraud and Events Integrated Management System (4), assessing, by means of the Security Event Management (1) and Fraud Management (2) systems, eventual new behavioral deviations and detecting fraudulent actions, thus progressively lowering the false-positive rate.

b) Dealing with Malicious Security Events:

The moment the Security Management System (1), by means of its Event Classification (103), Event Correlation (102) and Event Analysis (101) modules determines that a given event or set of related events constitutes a malicious attack against the institution's safety assets, it will forward information regarding this event to the Fraud and Events Integrated Management System (4), via messaging services or Web services. The latter system will in turn broaden its knowledge base in the Restrictions Management Module (403) and update the Fraud and Security Events Data Repository (5). At the same time, new banking transactions sent by the Banking Environment (3) to the Fraud and Events Integrated Management System (4) are evaluated taking into consideration the broadened information in the Restrictions Management Module (403), thus creating a cyclical mechanism between the 4 main systems that make up the solution, which are: the IT Security Event Management System (1), the Fraud Detection and Prevention Management System (2), the Banking Environment (3) and the Fraud and Events Integrated Management System (4).

Finally, although we have described the invention in the light of certain preferred realization modes, it must be pointed out that it is not limited to said modes, as stated in the attached Claims document.

Furthermore, a detailed description of one of this invention's applications that makes use of the functions of all the various modules has been provided as an example. Although the integrated use of all the described modules is recommendable to ensure greater precision in detecting a fraudulent banking event, other functional configurations can also be deployed by suppressing one or more modules.

On the other hand, preferred realization behavioral sequences were presented but this does not mean that other dynamic links cannot be implemented; in other words, it must be made clear that the invention is not limited solely to the described sequences, according to the attached Claims document.

Thus, the set of mechanisms utilized by the Fraud and Events Integrated Management System (4), illustrated in FIG. 8, does not change when used in other applications, while the architecture exposed in FIG. 3 easily adapted to meet specific needs, though preserving the basic principles. Furthermore, several means of implementing the connections illustrated in FIG. 6 can be deployed without sacrificing the goals, effects and advantages of this invention.

The invention claimed is:

1. A method of processing a banking event, comprising:
   storing data regarding a plurality of first banking events in a database;
   receiving data, at an electronic input system, regarding a second banking event from a requesting system;
   determining whether an electronic banking event analyzing system is available;
   if it is determined that an electronic banking event analyzing system is available, analyzing, using the electronic banking event analyzing system, the stored data according to predetermined rules to determine a score indicative of proposed action regarding the second banking event;
   if it is determined that an electronic banking event analyzing system is not available, using a previously determined score as the score indicative of proposed action;
   electronically transmitting, using an online device, the score indicative of proposed action to the requesting system; and
   updating the database with data regarding the second banking event based on the analysis.

2. The method of claim 1, wherein the stored data comprises data regarding a plurality of second banking events.

3. The method of claim 1, wherein the stored data comprises data regarding at least one of IP addresses, ATM codes, branches, accounts, or debit cards.

4. The method of claim 1, wherein the stored data comprises at least one of negative data indicative of fraud or positive data indicative of a lack of fraud.

5. The method of claim 1, wherein at least one of the first or second banking events comprises ATM transactions, and the method comprises:
   analyzing the ATM transactions for predetermined patterns; and
   updating the database based on the ATM transaction analysis.

6. The method of claim 1, further comprising:
   modifying the predetermined rules based on the score indicative of proposed action.

7. The method of claim 1, wherein the analyzing further comprises:
   transmitting a recommendation to the requesting system, based on the score indicative of proposed action.

8. The method of claim 1, wherein receiving data further comprises:
   receiving data regarding a customer associated with the second banking event.

9. The method of claim 8, further comprising:
   receiving data associated with a plurality of second banking events associated with the customer; and
   utilizing the updated database for the plurality of second banking events associated with the customer.

10. An electronic system of processing a banking event, comprising:
    a database storing data regarding first banking events;
    an input system configured to electronically receive, from a requesting system, data regarding a second banking event;
    an electronic banking event analyzing system configured to analyze the stored data according to predetermined rules to determine a score indicative of proposed action regarding the second banking event,
    wherein the input system is further configured to determine whether the electronic banking event analyzing system is available and, if it is determined that an electronic banking event analyzing system is available, receive the score indicative of proposed action from the electronic banking event analyzing system,
    wherein the input system is further configured to use a previously determined score as the score indicative of proposed action if it is determined that an electronic banking event analyzing system is not available;
    an online device configured to electronically transmit the score indicative of proposed action to the requesting system from the input system; and
    an update system configured to store the received second banking event data in the database, based on the analysis.

11. The system of claim 10, wherein the stored data comprises data regarding a plurality of second banking events.

12. The system of claim 10, wherein the stored data comprises data regarding at least one of IP addresses, ATM codes, branches, accounts, or debit cards.

13. The system of claim 10, wherein the stored data comprises at least one of negative data indicative of fraud or positive data indicative of a lack of fraud.

14. The system of claim 10, wherein at least one of the first or second banking events comprises ATM transactions, and wherein the input system further comprises:
    an ATM monitoring module that analyzes ATM transactions for predetermined patterns, and updates the database based on the ATM transaction analysis.

15. The system of claim 10, wherein the predetermined rules are modified based on the score indicative of proposed action.

16. The system of claim 10, wherein the communication system is further configured to transmit a recommendation to the requesting system, based on the score indicative of proposed action.

17. The system of claim 10, wherein the input system is further configured to receive data regarding a customer associated with the second banking event.

18. The system of claim 17, wherein:
    the input system is further configured to receive data associated with a plurality of second banking events associated with the customer; and the electronic banking event analyzing system is further configured to utilize the updated database for the plurality of second banking events associated with the customer.

19. The method of claim 8, wherein the previously determined score is associated with a previous banking event associated with the customer.

20. The system of claim 17, wherein the previously determined score is associated with a previous banking event associated with the customer.

* * * * *

UNITED STATES PATENT AND TRADEMARK OFFICE
CERTIFICATE OF CORRECTION

PATENT NO. : 8,660,954 B2
APPLICATION NO. : 12/772745
DATED : February 25, 2014
INVENTOR(S) : João Eduardo Ferreira Neto et al.

It is certified that error appears in the above-identified patent and that said Letters Patent is hereby corrected as shown below:

Title page, item (73),
"Assignee: Fundacao CPQD_Centro de Pesquisa
        E Desenvolvimento em
        Telecommuncacoes, Sao Paulo (BR)"

should read

--Assignee: Fundação CPqD—Centro de Pesquisa
        e Desenvolvimento em
        Telecomunicações, Sao Paulo (BR)--.

Signed and Sealed this
First Day of July, 2014

Michelle K. Lee
*Deputy Director of the United States Patent and Trademark Office*